United States Patent
Bagrinovskiy et al.

(10) Patent No.: US 9,983,761 B1
(45) Date of Patent: *May 29, 2018

(54) METHOD FOR INTERCEPTION AND BLOCKING OF MOUSE MOVE AND RESIZE EVENTS ON MOBILE DEVICE

(71) Applicant: Parallels International GmbH, Schaffhausen (CH)

(72) Inventors: Kirill Bagrinovskiy, Moscow (RU); Stanislav S. Protassov, Moscow (RU); Serguei M. Beloussov, Singapore (SG); Nikolay N. Dobrovolskiy, Moscow (RU)

(73) Assignee: Parallels International GMBH, Schaffhausen (CH)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/358,461

(22) Filed: Nov. 22, 2016

Related U.S. Application Data

(63) Continuation of application No. 14/976,174, filed on Dec. 21, 2015, now Pat. No. 9,535,567, which is a continuation of application No. 14/051,083, filed on Oct. 10, 2013, now Pat. No. 9,225,611.

(51) Int. Cl.

| | |
|---|---|
| *G06F 15/00* | (2006.01) |
| *G06F 13/00* | (2006.01) |
| *G06F 3/0481* | (2013.01) |
| *G06F 3/0488* | (2013.01) |
| *H04L 29/08* | (2006.01) |
| *H04W 88/02* | (2009.01) |

(52) U.S. Cl.
CPC ........ *G06F 3/04812* (2013.01); *G06F 3/0488* (2013.01); *G06F 3/04817* (2013.01); *H04L 67/2809* (2013.01); *H04W 88/02* (2013.01)

(58) Field of Classification Search
CPC ........................... G06F 9/4445; H04L 63/0272
USPC .................................................. 715/740, 788
See application file for complete search history.

(56) References Cited

U.S. PATENT DOCUMENTS

| | | | | |
|---|---|---|---|---|
| 2007/0245409 A1* | 10/2007 | Harris | ................. | H04L 63/0272 726/5 |
| 2011/0246904 A1* | 10/2011 | Pinto | .................... | G06F 9/4445 715/740 |
| 2012/0084713 A1* | 4/2012 | Desai | ................... | G06F 9/4445 715/788 |

* cited by examiner

*Primary Examiner* — Kevin Nguyen
(74) *Attorney, Agent, or Firm* — Bardmesser Law Group

(57) ABSTRACT

A method and computer program product for intercepting and blocking the mouse move and resize events on mobile devices transmitting remote application. The remote access client installed on the mobile device send the coordinates of user's touches to remote computer. The remote access agent, running on a remote host, blocks the consequences of user finger (or stylus) actions performed on a captured window of the remote application. The method defines the areas and elements of a captured remote application window that are not affected by the move/resize commands emulated by a mobile device user. This functionality is implemented by a control-agent component running on a remote host for receiving and processing the commands from a mobile device and for transmitting video stream and some metadata about remote applications to the mobile device.

20 Claims, 14 Drawing Sheets

BEFORE CONNECTION

Host (partner-side)
2560 x 1440 px

Desktop

Mobile device (viewer-side)
1024 x 768 px

Authorization

BEFORE CONNECTION

Host (partner-side)
2560 x 1440 px

Desktop

Mobile device (viewer-side)
1024 x 768 px

Choosing the remote desktop

Host (partner-side)
1024 x 768 px

Changing the resolution

CONNECTION

Mobile device (viewer-side)
1024 x 768 px

Choosing the remote application

METHOD FOR INTERCEPTION AND BLOCKING OF MOUSE MOVE AND RESIZE EVENTS ON MOBILE DEVICE

CROSS-REFERENCE TO RELATED APPLICATION

This application is a continuation of U.S. patent application Ser. No. 14/976,174, filed on Dec. 21, 2015, which is a continuation of U.S. patent application Ser. No. 14/051,083, filed on Oct. 10, 2013, which is incorporated by reference herein in its entirety.

BACKGROUND OF THE INVENTION

Field of the Invention

The present invention relates to a method for controlling views of host desktop applications to mobile devices, and, more particularly, to a method for interception and blocking of mouse like control commands when working with a window of a remote application on a mobile device.

Description of the Related Art

Often, a mobile device user wants to select and interface with software application from a remote desktop computer on his mobile device as if applications run on the mobile device. The desktop host computer can have several applications running at the same time either required to the user or started end executed independently. The user applications can be running on the host OS or within a virtual environment, such as a Virtual Machine or a container.

Remote Access Software, typically, captures a window of a remote application on the host. The user of a mobile device does not see a desktop of a remote computer and only sees the actual application scaled up to the entire mobile device screen. The Remote Access Software provides the application window, but does not block move and resize user actions performed on an active window.

Examples of Remote Access Applications are: Parallels Access (former Parallels Mobile), SplashTop Remote Desktop, TeamViewer. Other solutions for remote access are Access Remote PC, Ammyy Admin, Apple Remote Desktop, Citrix GoToMyPC, GPP Remote Control, LogMeIn, Radmin, RDM+Remote Desktop, VNC, Windows Remote, Assistance, Xtralogic Remote Desktop, etc.

Note that TeamViewer for mobile devices does not provide for remote window capture. SplashTop and Parallels Access use a single window on the client mode, where upon connecting to a remote computer, the resolution of the remote computer's screen changes to the resolution of the screen of the mobile device. If a mobile device is used as a client device, small screen size and an absence of the mouse can result in an inaccurate transmitting of the application window on the mobile device screen at any attempt to move or resize the window.

In particular, if a user uses a finger or stylus to press on the header area (Title bar+Menu bar+Tool bar) of a window and begins to pull it to the side, the window moves after the finger but as soon as the finger releases the window, it returns to its initial shape and position, because it is in a captured mode. In this mode, capturing utility or capturing procedure of remote access, the agent captures application window within the boundaries of the window, and the absolute position of the window is not considered in the process of capturing. However, the window captured during the moving process may have motion artifacts, such as dropped lines in different frames, changing absolute size of window and so on. Also, moving the window is a process that taxes computation resources and is often unwanted. Such "bouncing" of the window back and forth constitutes a wrong (incorrect) behavior, since the application that is being transmitted does not do it in its desktop version. Furthermore, it is very easy to press on the wrong part of a small window with the finger.

Accordingly, it is desired to allow the mobile device window to move and change its size while providing correct transmitting to a user. Given a small size of mobile device windows, when move or resize events occur, the useful area of a captured window becomes even smaller. Since a mobile device does not have a mouse, a standard event mouseOver (i.e., a mouse cursor is placed over an element, but the click has not happened yet) an application developer cannot inform a user (in tap mode—without visualization of mouse cursor) of a possible action that can be performed with the window by using fold out or pop-up menus and hints.

This negatively affects usability of the application, if a user accidently touches a header of the window and moves the finger slightly sideways (instead of straight up). Currently, attempts made by the developers of the Remote Access Software to prohibit the move and resize events on the host (partner-side) have not been successful. The inherent logic of a remote application cannot be changed by clicks, touch and move actions on its window. It is also not possible to acquire data reflecting custom application controls of the remote application.

In theory, low-level OS commands of a remote computer can be accessed in order to control the remote application. However, this solution is very costly and complex. Also, this approach can destroy security of the entire system. Another solution for accessing a remote desktop application is proposed by Synergy™ (http:**synergy-foss.org/).

The Synergy™ system lets a user to easily share his mouse and a keyboard among multiple computers on his desk. The Synergy™ runs as a client/server application, where the server is the computer that has the keyboard and the mouse attached to it, and all other computers are connected as clients. Switching from one display to another is only a matter of moving the mouse to the edge of the screen. The Synergy™ system detects the mouse pointer leaving one screen and entering another. This solution can be useful while doing presentations on several screens belonging to different computers. However, it does not help in terms of transmitting remote applications on mobile devices.

Applications developed for mobile devices do not normally have windows that are moved and resized, since the form factor of the mobile device does not usually permit it physically. Thus, when in the Application Mode and a remote window is captured, it is necessary to make sure that the user does not move or resize the window here as well. This will make the user feel as if the application that he is working with is running on the mobile device.

Accordingly, it is desired to have system for blocking mouse events on mobile devices rendering remote application windows as if the application runs locally on a mobile device.

SUMMARY OF THE INVENTION

The present invention relates to remote access of computer systems by mobile devices, and, more particularly, to intercepting and blocking of mouse move and resize events on mobile devices transmitting remote applications' windows that substantially obviates one or more of the disadvantages of the related art.

In one aspect, a method and computer program product for blocking the mouse move and resize events on mobile devices transmitting remote application's window is provided. A mobile device (e.g., a tablet, a mobile phone or a smart phone) has a remote access client installed on it for a remote access of applications of a remote computer or a server. The remote computer has remote access agent installed on it. The remote access agent has a connection to the remote access client. The remote access agent blocks the consequences of some user's finger (or stylus) move or resize or other unexpected (to the user) commands generated during pointer manipulations on a window on the mobile device. A method, in accordance with the exemplary embodiment, defines the areas and the elements of a remote application window that are not affected by the move/resize commands emulated by a mobile device user.

This functionality is implemented by an agent component running on a host (partner-side) before the moment of receiving the commands from a mobile device (a client). The exemplary method allows for application window not to react to any user finger manipulations over the window that can move or resize the window. This maintains the inherent window behavior logic in a captured mode and eliminates undesired shaking of the window or its elements.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 3:
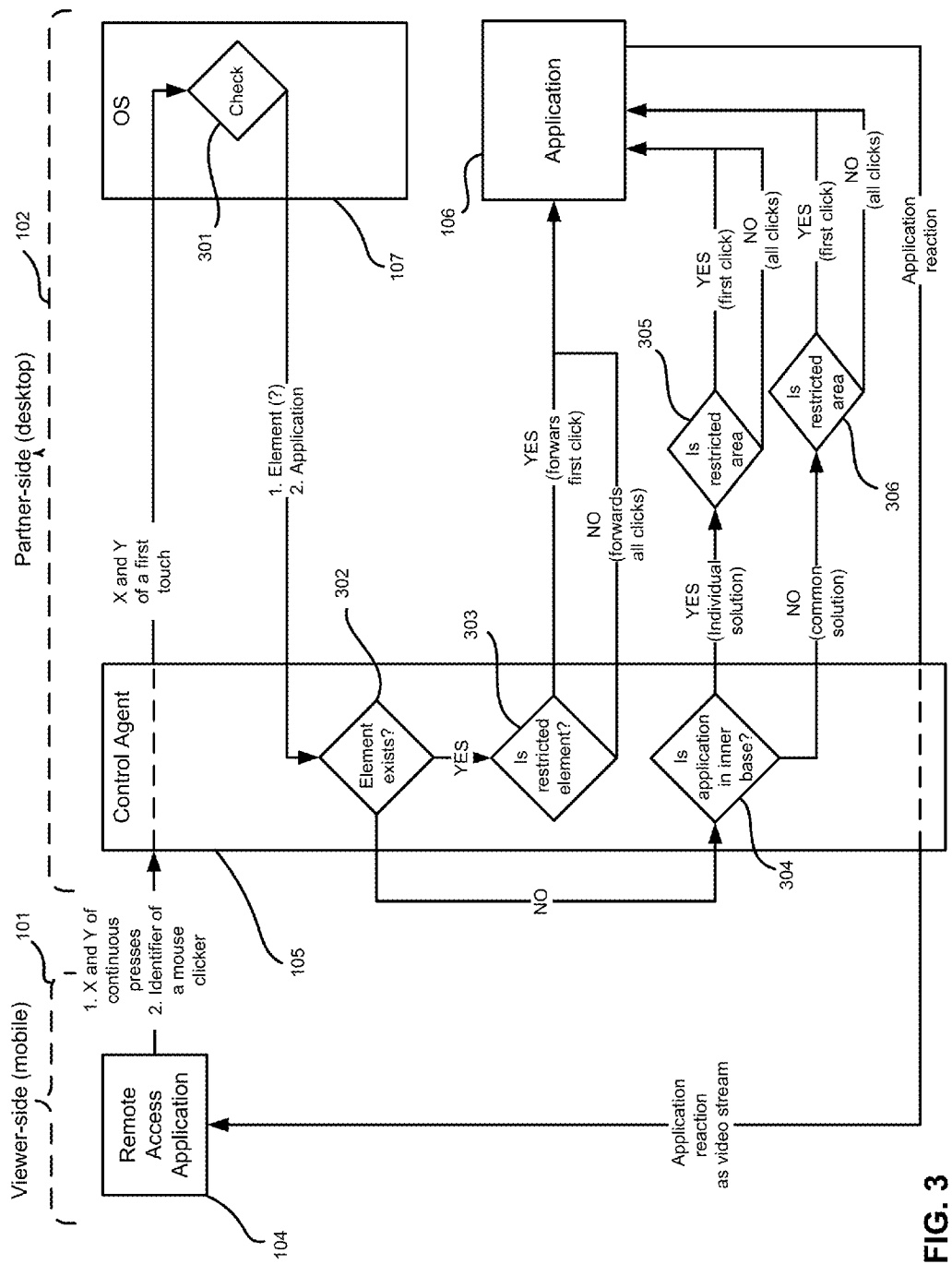
Figure 4:
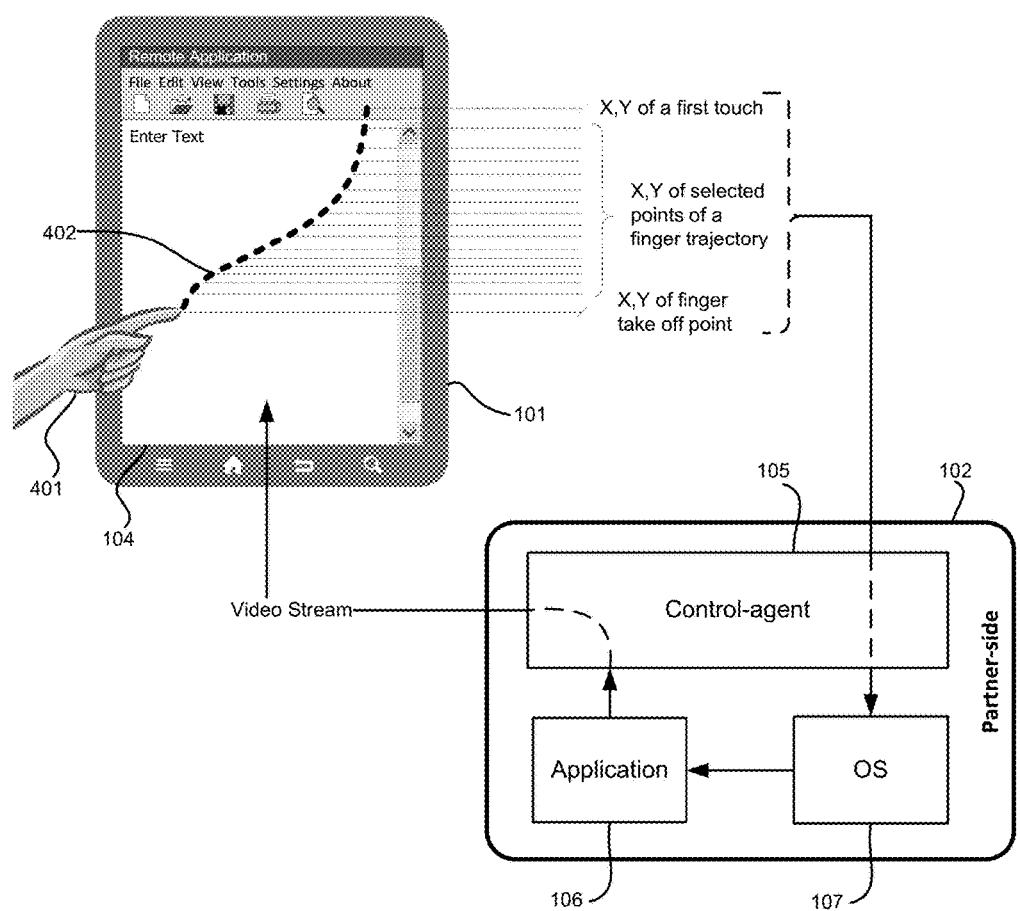
Figure 5:
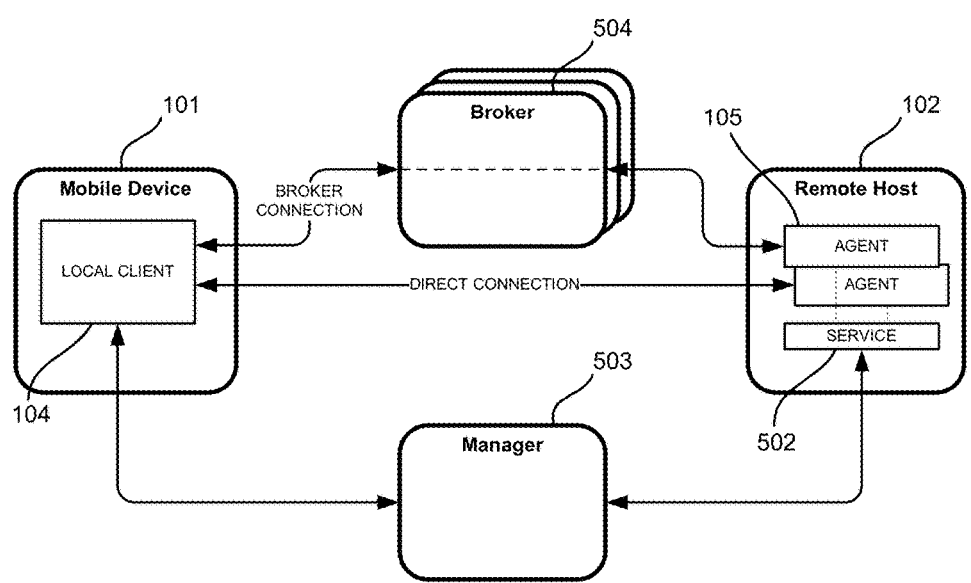
Figure 6:
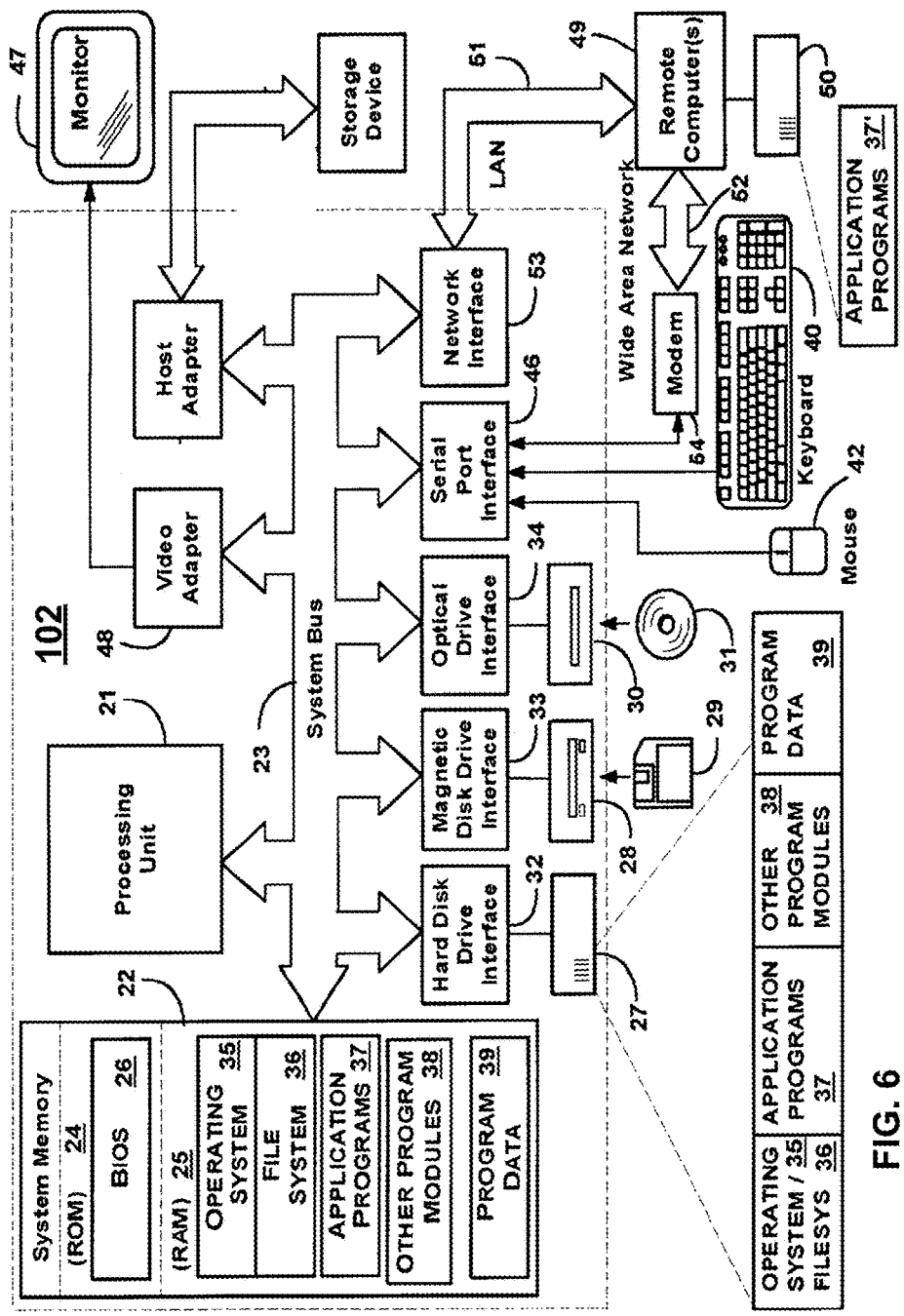
Figure 7:
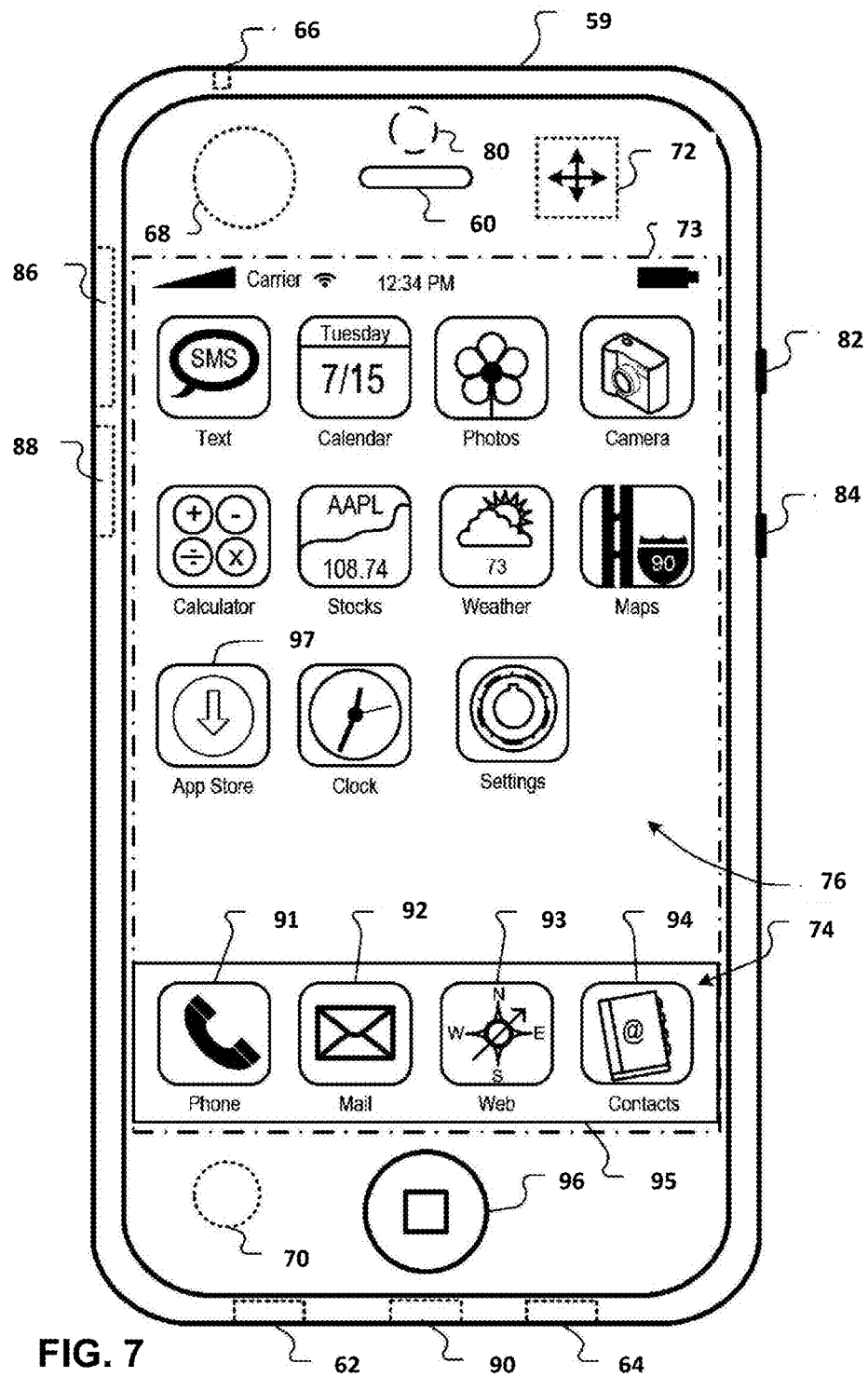
Figure 8:
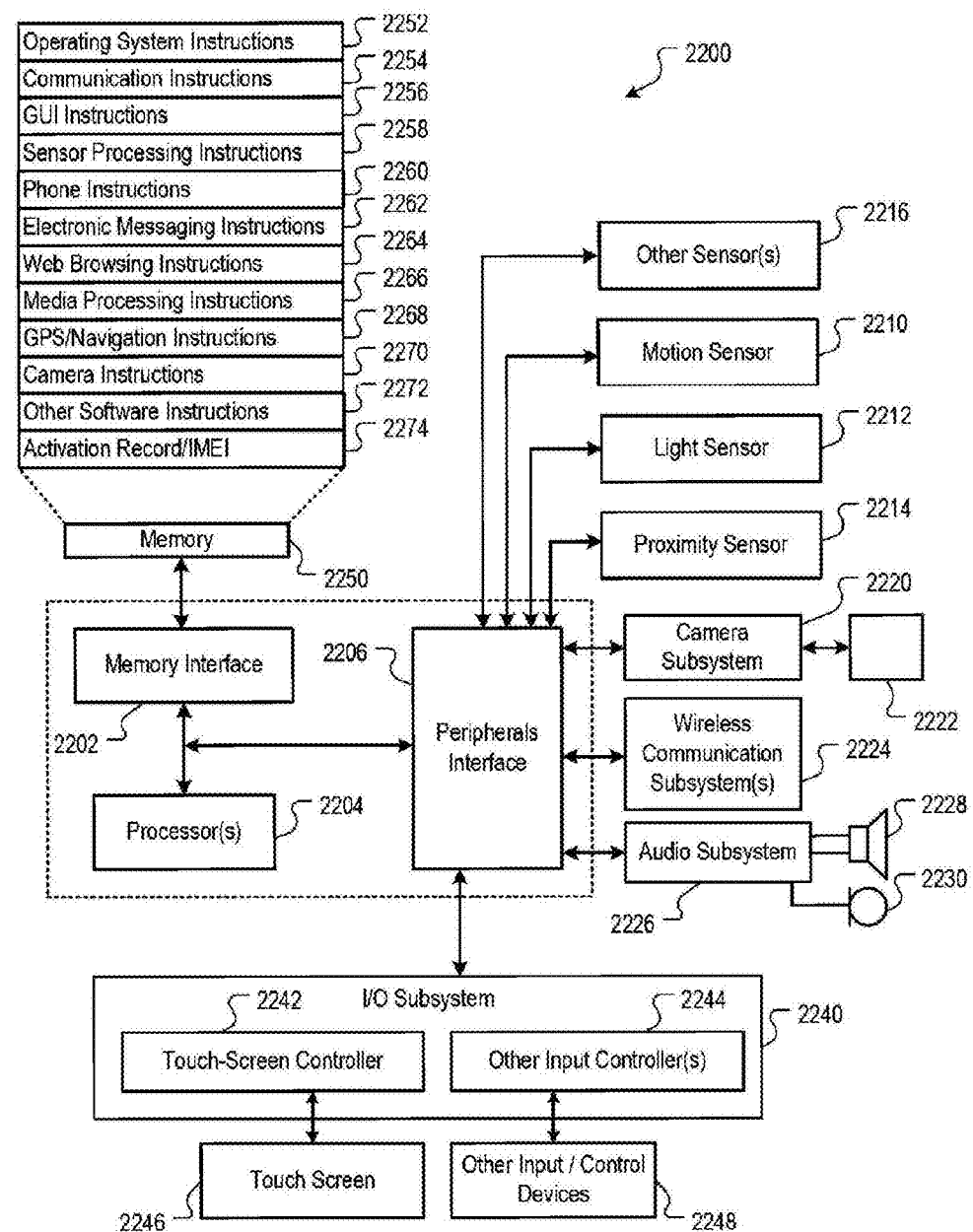

FIG. 3 a logical scheme of passing commands between the client and the host via the control-agent, in accordance with the exemplary embodiment;

FIG. 4 a scheme of exchanging commands between a client and a host without analyzing the coordinates of a first touch;

FIG. 5 illustrates an architecture of a remote access system used in the exemplary embodiment;

FIG. 6 illustrates a schematic diagram of an exemplary computer or server that can be used in the invention;

FIG. 7 is a block diagram of a mobile device on which the invention can be implemented;

FIG. 8 is a block diagram of an exemplary implementation of the mobile device.

Figure 9:
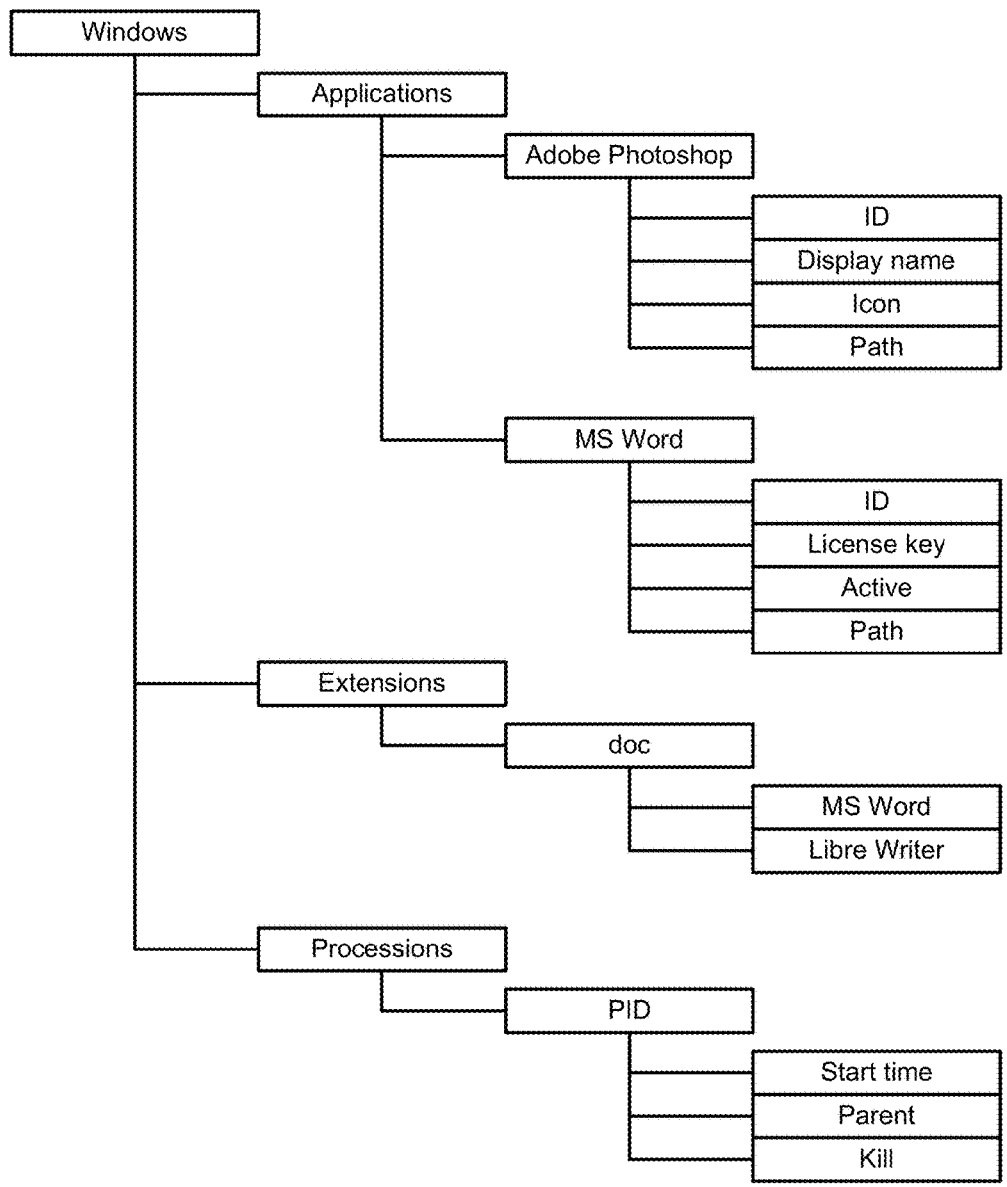

FIG. 9 illustrates a fragment of a name space tree, in accordance with the exemplary embodiment.

FIGS. 10-14 illustrate screenshots of a mobile device screen and a remote desktop screen view during the remote access process.

DETAILED DESCRIPTION OF EMBODIMENTS OF THE INVENTION

Reference will now be made in detail to the embodiments of the present invention, examples of which are illustrated in the accompanying drawings.

A method and computer program product for blocking the mouse move and resize events on mobile devices transmitting remote applications is provided. A mobile device (e.g., a tablet, a mobile phone or a smart phone) has a remote access application installed on it for a remote access of applications of a remote computer or a server. The remote access application blocks the consequences of user's finger (or stylus) moves performed on a captured window of the remote application. A method, in accordance with the exemplary embodiment, defines the areas and the elements of a captured remote application window that are not affected by the move/resize commands emulated by a mobile device user.

The control-agent creates a socket and calls a system command "listen" indicating the socket prior to connecting to the host. The socket is an abstract module—i.e., it is the end point of the connection between the remote host and the local client. The mobile device (client) also creates a socket and invokes a "connect" operation using the local socket and the address of the remote socket. If the connection is no longer needed, the socket is closed by a system call "close." The data exchange between the client and the host is implemented over the sockets. An arbitrary number of the created sockets can be defined by a system architect based on the needs. According to the exemplary embodiment, a number of sockets is created on the host side and on the client side—both the client and the server have one socket for connecting to the Manager server, and at least one socket for connecting to each other and a separate socket for sending and receiving video data.

The proposed functionality is implemented by an agent component (application) running on a host before the moment of receiving the commands from a client. The exemplary method allows for the application window not to react to any user finger manipulations over the window that can move or resize the window. This implementation maintains the inherent window behavior logic in a captured mode and eliminates undesired shaking of the window or its elements.

Note that the exemplary embodiment deals with the full screen mode of the mobile device (also referred to as Coherence® or application mode). In this mode the application window occupies the entire space on the mobile device screen. In the capture mode, edges of the remote application window fit within the edges of the mobile device screen. Therefore, the user does not need to move or resize the application window. However, if a user wants to see the desktop of a remote computer with several application windows, he can switch to a desktop mode in the most remote access software. In the desktop mode, the user should be able to move and resize application windows.

According to the exemplary embodiment, capture of a host application window is performed separately for each of the host application windows and several video streams are sent to a mobile device. However, the mobile device screen displays less application elements. If the mobile device displays a full screen capture mode, exiting the full screen is restricted. The host desktop is displayed on the mobile device with 1:1 ratio.

In one exemplary embodiment, the host screen can display control elements over the application window. These elements are protected from execution by a mobile device user. The control elements are detected prior to encoding of the video stream and the data related to these elements is sent to the mobile device along with the video data. Thus, the mobile device can block the commands directed to the protected elements. Alternatively, the command from the mobile device are checked on the host and blocked if necessary.

According to one exemplary embodiment, the mobile device screen displays the application window in a pseudo-full screen mode. The window boarders with elements controlling the appearance of the window are outside the mobile device screen (or hidden). Any user clicks on these elements can occur only accidently. Thus, the hidden from the user elements should be protected from the user clicks. If the window has some elements that can change the appearance of the window, these elements can be determined as restricted. For example, a user attempt to switch a flash player to a full screen mode will be blocked.

According to the exemplary embodiment, the proposed method can be used when two computing devices are involved in remote communication. One device can be a mobile device (or a desktop computer)—i.e., a client device, and another device is a remote computer or a server—i.e., a host device. According to the exemplary embodiment, any attempts to move and resize the host application window generated on the client are blocked. In one embodiment, after the user action is blocked, the user is offered alternative actions or directed to some elements that this action can be performed on.

The host has a control-agent component implemented on it. The control-agent receives the commands from the client component local-client and passes the video stream back. Thus, the client can have administrative control over the host and can use the host's applications. The client user launches his local-client in a window capture mode. This means that an application launched on its native computer (host) is generated on a mobile device screen (client) as if the application actually runs on the client.

According to the exemplary embodiment, the application window has working areas available to the user for performing the normal application actions (e.g., to draw, to write text, to press buttons, etc.) by a user finger or by a stylus. Additionally, the application window has the areas defined by the application developers that do not repeat the behavior of the window on its analog on the host. The application includes a built-in functionality for blocking the move and resize events generated when a user grabs a window header in order to move it or take the right lower corner in attempt to resize the window by pressing left mouse button.

Since a user finger or a stylus do not work like a mouse (do not have the mouseOver events in a tap mode of remote access), and because an area of the mobile device screen is often relatively small, the user is relieved of the window move and resize actions. According to the exemplary embodiment, the move/resize events are blocked by the control-agent on the host upon being intercepted from the client. If the control-agent recognizes that a click occurred on the area of the screen, which can be potentially susceptible to move and resize operations and the host is capable of executing these operations, the subsequent commands from this area (following the first click) are ignored by the control-agent. In this case, the client user does not see any effect after moving his finger over the screen.

According to the exemplary embodiment, GUIs of the applications of the host can be written by the two different methods. Accordingly, detection of restricted areas of the window is also implemented using two different algorithms. A first method is used by vendors of operating systems, for which the application is developed. The application GUI window is assembled (at an application level) from different elements. The control-agent can request from the OS an element-related data for the clicked or touched element. In this scenario, the control-agent uses "restricted element" entity (instead of the restricted area), and blocks the move and resize events originated over this element.

A second method can be used by third-party developers, who create their own custom made GUI elements instead of the ones provided by the OS. Consequently, the control-agent cannot recognize the clicked or touched element. Instead, the control-agent determines coordinates of the user click (or touch). In this case, the control-agent operates with a "restricted area" and blocks the move and resize events originated within this area.

According to one exemplary embodiment, the application window is assembled from API OS elements. The developer of a remote access application defines the elements, which are not supposed to react to move and resize operations. This data is built into the application code or into the application library. The GUI window controls (elements) of a single touch type are: a Title Bar, a Tool Bar, a Status Bar, a Border, a Resize Handle. The elements that require detection of actions performed after the first touch are: a Check Box, a Combo Box, Context Menus, Control Buttons, a Data Grid, Dialog Boxes, a List Box, a Menu Bar, a Popup Menu, a Progress Bar, a Radio Button, a Scroll Bar, and a Text Box. This data can be represented, for example, by a list of restricted elements in one array in the code, and—not restricted elements in another array.

Note that, the Tool Bar has Control Buttons that are not "one-touch" elements. However, the area of the Tool Bar, which is not occupied by the Control Buttons, is the "one touch" area. The Tool Bar can often have a Text Box for entering search strings. In this case, when an element of restricted from move/resize elements contains an allowed for move/resize operations sub-elements, the control-agent does not need an additional check, because the click occurs on the allowed (top) element. The control-agent can find out (by an additional request) on which element the clicked element resides, but in most cases it is not required. The additional request is a function GetElementUnderCoordinates (x, y, element), which can return one and more element types. The coordinates of the click put in the parameters of this function.

A client user launches his local-client of the Remote Access system and connects to the host. Then, the client uses a window of the remote application and can perform manipulations over it by pressing on different areas of the screen. Each screen pressing action triggers the client to send a command to the host. The command can contain coordinates X and Y of a point of contact of a finger (or a stylus) with the screen. The coordinates can be transferred to the host either in scalar or in vector form, when the user moves his finger. The commands also may contain an identifier of a mouse button (likely of a left button) requiring emulation.

According to the exemplary embodiment, the command is intercepted by the control-agent. The control-agent needs to know not only the coordinates of the first touch, but the application which window has been touched by the client user. The control-agent determines to which application on the host the first click (and possibly the subsequent clicks) has to be transferred to. The control-agent, in turn, calls the OS of the host in order to find out what is located at the coordinates X and Y in a global coordinate system (i.e., in a coordinate system of the entire screen of the remote desktop).

The OS has the data related to all open windows, so it can provide it to the control-agent. The OS's response contains an application ID corresponding to the X and Y coordinates and a type of the window element. The control-agent has the predetermined list of known elements with marks "needs to be blocked" or "does not need to be blocked." The control-agent checks the mark of the element. If the element is "needs to be blocked" element, the algorithm for blocking move and resize operations is activated (See blocks 302, 303 and 106 in FIG. 3).

According to the exemplary embodiment, a first touch to the restricted area triggers the emulation of a one click by the control-agent. The one click is transferred to the application on the host for execution. Note that all subsequent commands received from the client (including release of the finger—mouseUp command) are ignored by the control-agent, because they must not transfer to application.

However, if the control-agent determines that the finger press was executed over a non-restricted area (element with mark "does not need to be blocked"), the first click and all subsequent commands are transferred to application without repeated checking against the element list. This process continues until the finger press is released (i.e., mouseUp command).

According to another exemplary embodiment, an application window is created by graphic methods of a programming language. The application can have the elements created by means of a Picture Box, Line, Shape, etc. Additionally, some proprietary elements can be used or unconventional use of Title Bar, Menu Bar etc., can be implemented. The application developer can potentially program move/resize operation for any of controls or areas of the application window. This complicates detection of the restricted areas for the control-agent.

Accordingly, a special inner (local) predetermined database containing coordinates of the restricted areas for each of the proprietary applications is used (see block 304 in FIG. 3.) The GUIs of most popular desktop applications can be checked and a database of dispositions of restricted areas for each application can be created. If the application is found in this database the individual approach can be used. If the first click was in restricted area, only the first click is transferred to the remote application. If the first click was in non-restricted area, all clicks are transferred to the remote application.

If the application data is not found in a local database, the top window area of 50 px in height is considered to be restricted. Note that an arbitrary height other than 50 px can be used depending on the application. If a first click is in the restricted area only the first click is transferred to the application. If the first click was in non-restricted area, all subsequent clicks are transferred to the application.

According to the exemplary embodiment, there are three steps of checking the location of a first click is of a mobile device user:

1. A host control-agent provides the coordinates of the first click to the OS and requests element and application identifiers;

2. If the OS does not return the IDs, the control-agent retrieves the coordinates of the restricted area of the application window from the internal applications database;

3. If the application is not found in the database, the control-agent take coordinates of restricted area template (which fits most of the applications' windows).

If the phase 1 is completed successfully, the first touch element is compared against a list of restricted elements contained in the control-agent module. If the element is restricted, subsequent clicks are not sent to the remote application and the phase 2 and 3 are not executed. If the phase 1 is not successful, the phase 2 is executed. If the phase 2 is not successful, the phase 3 is executed. In phase 2 and 3, the area of the first click is compared against the restricted area of the window according to the database (individual solution) or to the template coordinates (common solution).

According to the exemplary embodiment, four sources of information about applications, windows and elements are used:

1. A list of restricted elements encapsulated in the control-agent;

2. A database of tested applications with proprietary interfaces that do not have standard elements, but have pre-determined restricted areas;

3. Coordinates of a restricted area template;

4. Remote applications' name space tree structure.

Note that the above sources are static. The host OS is a dynamic source. The control-agent call the host OS after every first click in order to determine the coordinates of the click. Then, the control-agent uses the static sources in order to determine whether the element (or area) is restricted.

According to the exemplary embodiment, the user clicks are processes as follows:
  all user clicks are sent to the control-agent on the host;
  a first click is passed on to a remote application by default; and
  if a first click is on a restricted area/element, all the subsequent clicks are blocked.

The database can be implemented as a library of the control-agent, or an array in the code of the control-agent. The database is used for checking after the first user click is detected. The database is updated at the application update. Also, it is possible to implement the database on the server and to use it in real time. In this case, the control-agent can obtain fresh information about application after each launch. Alternatively, an application window can be analyzed as a raster image. For example, the raster analyzer (implemented into the control-agent code) can find a Title Bar in real time.

The control-agent, once launched on the remote computer, requests, from the OS the information about the installed applications. This data is transformed into a tree-like name space structure, which is analogous, for example, to the Windows registry. The name space structure is known in advance, and is defined for the control-agent by the developer. An example of a fragment of such a tree is shown in FIG. 9.

The control-agent API has four types of requests for working with the name space:
  SUBSCRIBE—a request for values and subscription for certain objects from the name space. This means that if something changes on the remote computer regarding the subscribed information, the control-agent is notified about this in real time.

QUERY—this API request is similar to the subscribe request, only without the subscription—in other words, it permits the control-agent to request a value from the name space tree one time.

SET—writing into the name space. Uses for changing of values of parameters. For example, control-agent, can find the necessary application in the name space, and make it active by means of changing its daughter parameter Active to true.

RPC—remote procedure call, which initiates more complex actions than the SET request. Note that the SET request is one particular example of RPC. Examples for which the RPC request can be used are killing a process on a remote device or emulating a pressing of the shift key.

The control-agent can request a tree from the OS only once per session and the tree structure remains in the memory of the computer until the end of the session. The tree structure changes in real time based on the subscriptions. The tree structure is available to the control-agent and to the local-client. The name space also has information about active application windows. The data changes are available to the control-agent and to the local client by subscription or in real time.

Thus, the mobile device, during remote access sessions, can display a list of all installed remote host applications or a list of active windows. The mobile device user can launch these applications on the mobile device. Note that conventional Remote Access System solutions for mobile devices only provide a list of active (running host applications') windows as, for example, Task Switcher in MS Windows™ invoked by pressing Alt+Tab keys.

The control-agent (in addition to processing the clicks) can receive the mobile commands like run application, focus to application window, close application, key commands, etc. The application ID derived from the name space is used as a parameter. The commands match the internal format of a particular remote access application. The command is encapsulated into a packet and is sent over a socket. The control-agent derives the application ID from the name space, finds a path to the executable file of the application on the host and launches the application. The exemplary embodiment uses name space of the applications and the name space of the open windows.

According to the exemplary embodiment, the host name space is also available from a client, because the name space is created and stored in the control-agent which works with the local-client of the same vendor. Thus, the client can decide on the actions to be taken after the user touches a particular element of the application window. For example, a user works with the text editor and touches the text input element. The local-client requests the type of the touched element. The control agent sends the answer indicating that the element is a text box. The local-client displays the key board so the client can input the text. Note that the conventional Remote Access Systems do not display the key board and the user has to activate the local key board himself.

Figure 1:
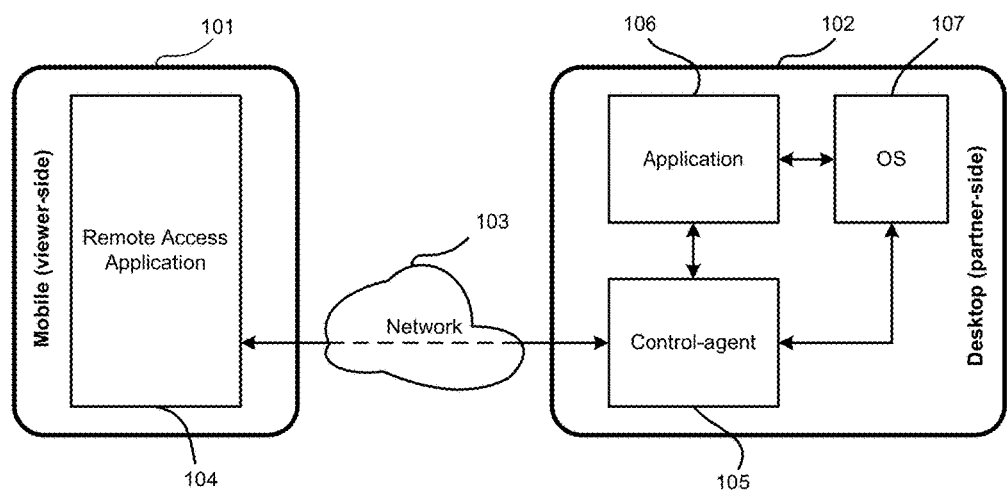
FIG. 1 illustrates an architecture for interaction between a client and host, in accordance with the exemplary embodiment.

FIG. 1 illustrates architecture for interaction between a client component and a host component, in accordance with the exemplary embodiment. A mobile device (client) 101 has a Remote Access application 104 running on it. The Remote Access application 104 is connected over the network 103 with a remote computer (partner-side, or host) 102. Control and transmitting of the remote application 106 is implemented by a control-agent module 105. The application 106 opens within the environment 104 occupying the entire mobile device screen 101. A mobile device user presses different areas of the window by his finger. A command containing coordinates X and Y of the finger press is transferred to the control-agent 105.

The control-agent 105 requests the OS 107 in order to determine the element located at the coordinates X and Y of a first click. The OC 107 provides an identifier of the element based on the coordinates. The control-agent executes an exemplary code:

Element handle element;
ErrorCode error=GetElementUnderCoordinates (x, y, element);
if (error==success) {
ElementType type=GetElementType (element);
ElementPid pid=GetElementPid (element);
Free (element);
}

The control-agent 105 passes the first click to the application 106. Then, the control-agent 105 determines, using its elements database, whether the element with the given identifier is restricted from move/resize operations. If the element is not found in the restricted element database, all subsequent commands after the first click are passed on to the application 106. If the element is found in the restricted elements database, all subsequent commands are ignored. Note that the described interaction continues from a first press on the element of the window 104 until the release.

Figure 2:
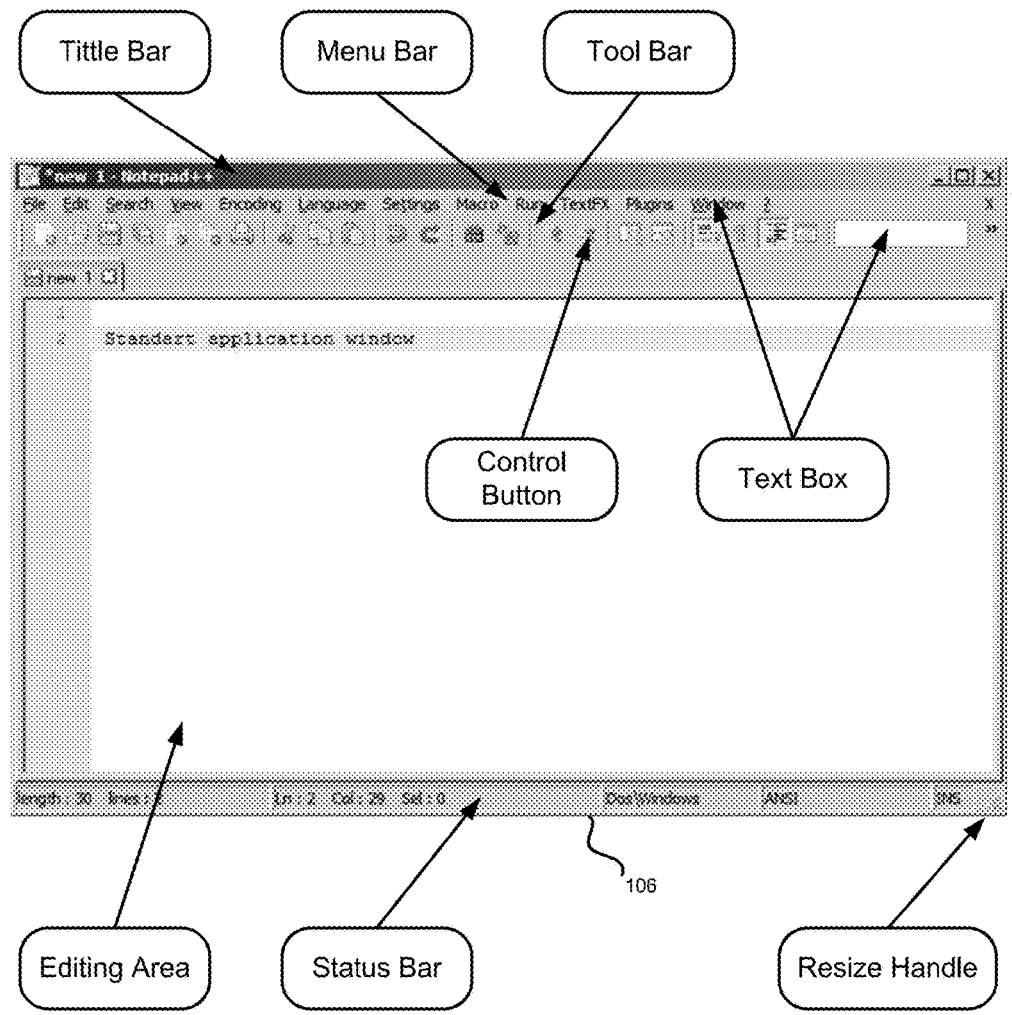
FIG. 2 illustrates a standard GUI of an application window used in the exemplary embodiment.

FIG. 2 illustrates a standard GUI of an application window used in the exemplary embodiment. Typical controls are: a Title Bar, a Tool Bar, a Status Bar, and a Resize Handle. These controls are restricted from move/resize operations. The elements such as a Menu Bar, a Control Button, a Text Box, and an Editing Area are not restricted. Note that the Tool Bar has restricted areas that are occupied by the non-restricted elements. For example, if a user touches and moves the Editing Area on the text, the control-agent checks and permits the moving of the mouse and forwards all commands to the application, because the Editing Area is not a restricted element. The text becomes selected.

If the user touches and moves the place to the right from "?" on the Menu Bar, the control-agent checks and permits the moving of the mouse and forwards all commands to the application, because the Menu Bar is not a restricted element. However, nothing occurs in this example. If the user touches and moves the Title bar, the control-agent checks and prohibits the moving of mouse and forwards only the first command to the application, because the Title bar is a restricted element. Only the first click is forwarded.

FIG. 3 illustrates a logical scheme of passing commands between the client and the host via the control-agent, in accordance with the exemplary embodiment. A process is started when the user of the mobile device 101 touches the screen displaying the window of the remote application 106 emulated by means of video stream from host 102. A single touch (press and release of a finger) or multiple touches (press and drag of a finger) commands are sent to the host desktop 102. The coordinates X and Y and the mouse button ID are intercepted by the control-agent 105 residing on the host 102.

The control-agent 105 generates a request to the OS 107 for data related to the element defined by the coordinates X and Y of the first click. The OS 107 performs a check 301 against its database of active application and responds to the control-agent 105. The response contains the identifiers of the application and may be the element where the first click has occurred. If the OS 107 cannot determine the first click element due to a proprietary nature of the application GUI, the data reflecting the application window is returned to the control-agent 105.

Subsequently, the control-agent 105 analyses the response in block 302. If the element is found by OS, the control-agent 105 performs a check, in block 303, against its own database of the restricted elements. If the element is found, the control-agent 105 passes only the first click to the application 106. Otherwise, the entire sequence of commands representing the events initiated on the element is passed on to the application 106. If the analysis in block 302 reveals that the application window has unidentifiable proprietary elements (i.e., a first click element cannot be determined), the check 304 is executed in order to find data related to the application.

If the application is found in the database in step 304 and the click is on the restricted area (in step 305), the individual solution is applied and only the first click is sent to the application 106. Otherwise (the first click is on the non-restricted area), the entire sequence of commands representing the events initiated on the element is passed on to the application 106. If the application is not found in the database in step 304 and the click is on the restricted area in step 306, a common solution is applied and only the first click is sent to the application 106. Otherwise (the first click is on the non-restricted area), the entire sequence of commands representing the events initiated on the element is passed on to the application 106.

Subsequently, the application 106 reacts to the command(s) according to its inherent logic. The reaction(s) of the application 106 is intercepted by the control-agent 105 as video stream and passed on to the Remote Access application 104, which modifies the application window on the mobile device screen accordingly. The application 106 does not react if only one click is passed to it. Thus, nothing changes in video image are returned back to the Remote Access application 104.

Note that seems one click does not need to be transmitted, but it is transmitted for added safety—it is safer to transmit one click rather than transmit nothing. The mobile user may merely want to focus a particular element. Thus, forwarding the first click is useful for user experience as well. The user should preferably see the same results of the same actions.

FIG. 4 illustrates passing of the commands between the client and the host without analyzing the coordinates of a first touch, in accordance with the exemplary embodiment. According to the exemplary embodiment, when a window capture mode is initiated, a resolution of the screen of the host 102 is changed to the resolution of the screen of the mobile device (client) 101. Thus, both of the devices have the same system of coordinates. If the host has two or more physical screens, the resolution is changed on all of the screens to match the resolution of the client and the same image is displayed on all of the screens.

When a user 401 drags his finger along the screen of the mobile device 104, a sequence of commands is sent to the partner side 102. These commands can be divided into three groups:

1. Coordinates of the first touch;
2. Coordinates of the finger trajectory 402; and
3. Coordinates of the last touch (a release point of the finger).

According to the exemplary embodiment, the partner side control-agent 105 intercepts the singles coming from the client 104. The commands come in order of their origination according to the TCP/IP rules that provide an order of the data packets. If the control-agent 105 does not analyze a location of a first command, all coordinates of the subsequent touches are passed to the remote application 106 via the OS 107.

According to the exemplary embodiment, the application 106 reacts to the received commands according to its inherent logic as if the action were performed by a native user of a remote desktop using the mouse left button clicks. The image of remote desktop screen is changing. A video stream of remote screen's images is sent back to the captured application window 104 and the client sees the reactions of the remote application 106 on his screen. According to the exemplary embodiment, UDP can be used as a communication protocol.

FIG. 5 illustrates architecture of a remote access system used in the exemplary embodiment. According to the exemplary embodiment, a plurality of control-agents 105 can be implemented. A number of the control-agents 105 can correspond to a number of connections established between the local device (client) 101 and the remote host 102. In other words, a separate control-agent 105 is launched by a service 502 for each remote access session. The service 502 is a resident daemon stored in the memory of the computer 102. The daemon 502, once launched, constantly listens for the commands coming from the Remote Access application via a manager sever 503.

The server 503 has a database of registered users of applications. The local-client 104 on the mobile device 101 and the service 502 have the same user settings established ahead of time for efficient connection. When the user 101 wants to acquire a remote access to the computer 102, he first sends a request to the manager 503. The manager 503 checks the validity of the owner of the local-client (i.e., the Remote Access Application) 104 and, in case of successful validation, sends him a response in a form of a list of devices affiliated with the local-client 104. Note that the affiliation means that the devices have the same user registration data.

The remote devices running their own service 502 are marked in the list as active and ready to be connected. The user of the mobile device 101 selects a desired remote host 102 and sends a connection request to the manager 503. The manager 503 calls the service 502 and provides it with the network location of the mobile device 101. The service 502 starts the control-agent 105, which connects to a broker (i.e., a proxy server) 504. Note that the broker 504 is provided by a Remote Access system vendor and works based on proxy principle. Subsequently, the broker 504 opens the connection channel (e.g., socks 5 based) for a given pair of the devices. Note that some vendors of Remote Access Software use their own protocol and others use RDP, VNC, X11, etc.

The vendor can have several brokers 504, and the manager 503 selects the broker closest to the host 102. Alternatively, the mobile device 101 and the remote host 102 can be connected directly without the broker. The direct connection is possible, if the mobile device 101 and the remote host 102 are connected using a VPN (peer-to-peer connection). Alternatively, a proxy connection (e.g., using a broker) or LAN (Ethernet or Wi-Fi) connection can be used. The service 502 determines whether the devices can be connected directly. If the network allows for direct connection the manager 503 provides the IP address of the mobile device 101 and establishes the direct connection. If the direct connection is not available, the service 502 launches the agent 105 for connecting via the broker 504.

FIG. 9 illustrates a fragment of a name space tree. According to the exemplary embodiment, there is structured information about installed applications. A local-client as well as control-agent is able to obtain the identifier of an active application from this structure and give it to control-agent as parameter for executing some command to application.

Figure 10:
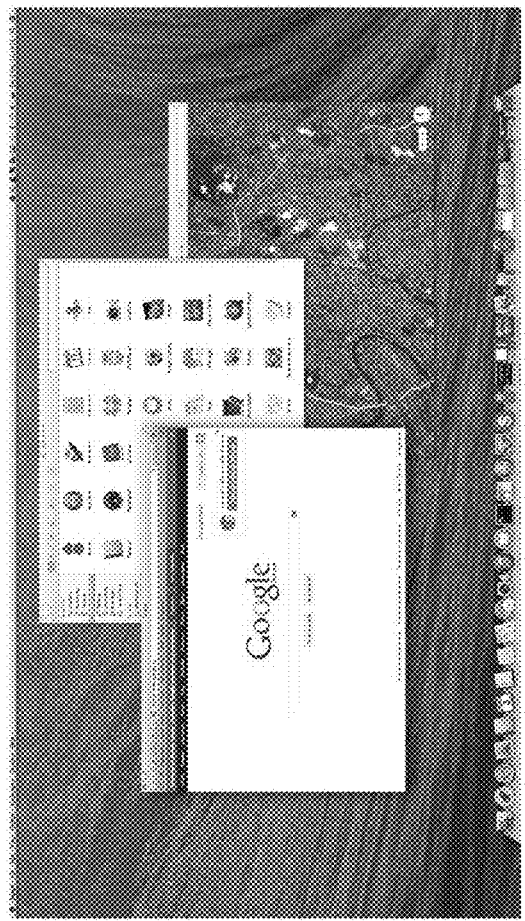
Figure 10:
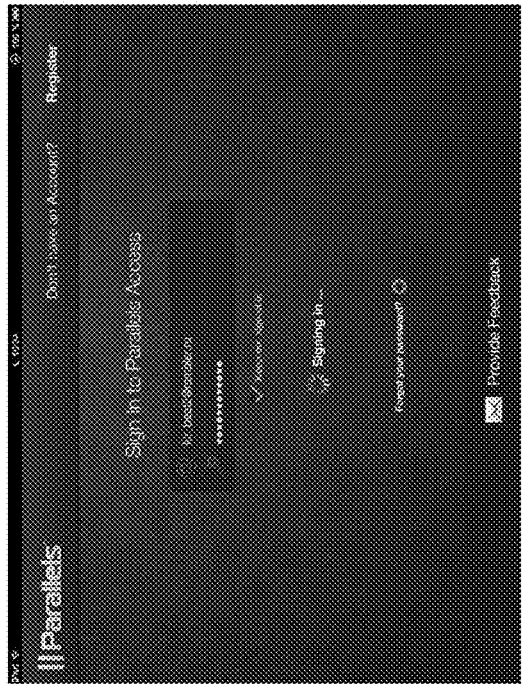
Figure 11:
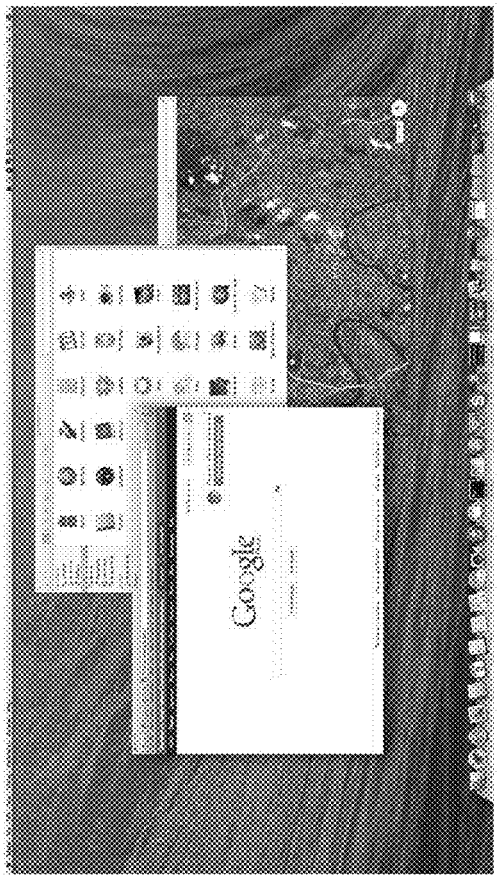
Figure 11:
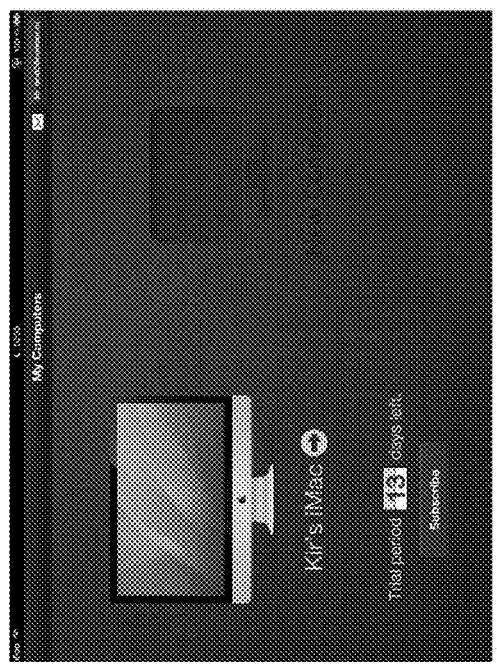
Figure 12:
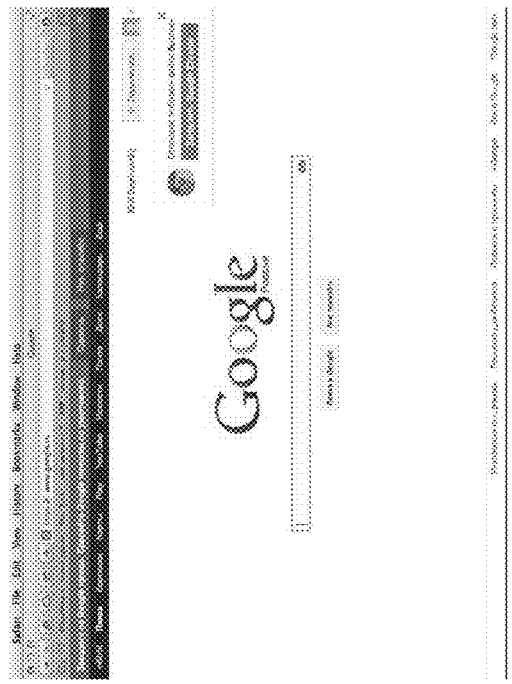
Figure 12:
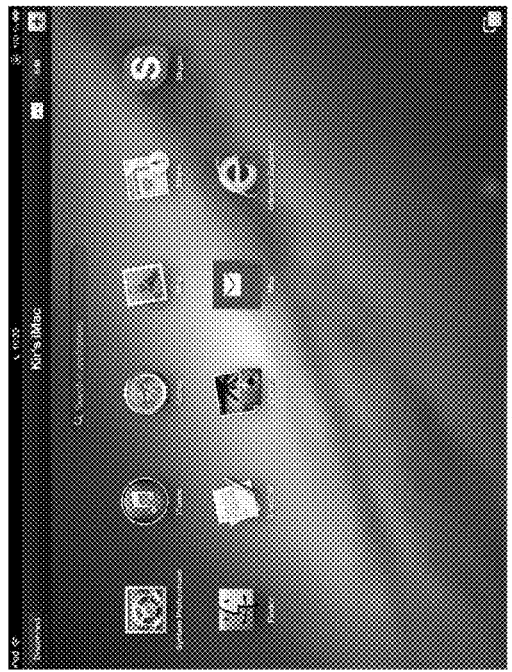

FIGS. 10-14 illustrate the screen shots of the mobile device screen and the remote host screen during the connection session. FIG. 10 illustrates a state when the client runs the remote access client requiring authorization. After the authorization, FIG. 11 illustrates that the mobile user can select between several remote hosts running the control-agent with the same credentials as the mobile client. After selecting the remote host and connecting to it, the resolution of the screen on the host has changed to the resolution of the client (see FIG. 12). Meanwhile, the mobile device screen displays a list of icons of remote applications. The client receives the list of the icons from application name space generated at launch of the control-agent.

Figure 13:
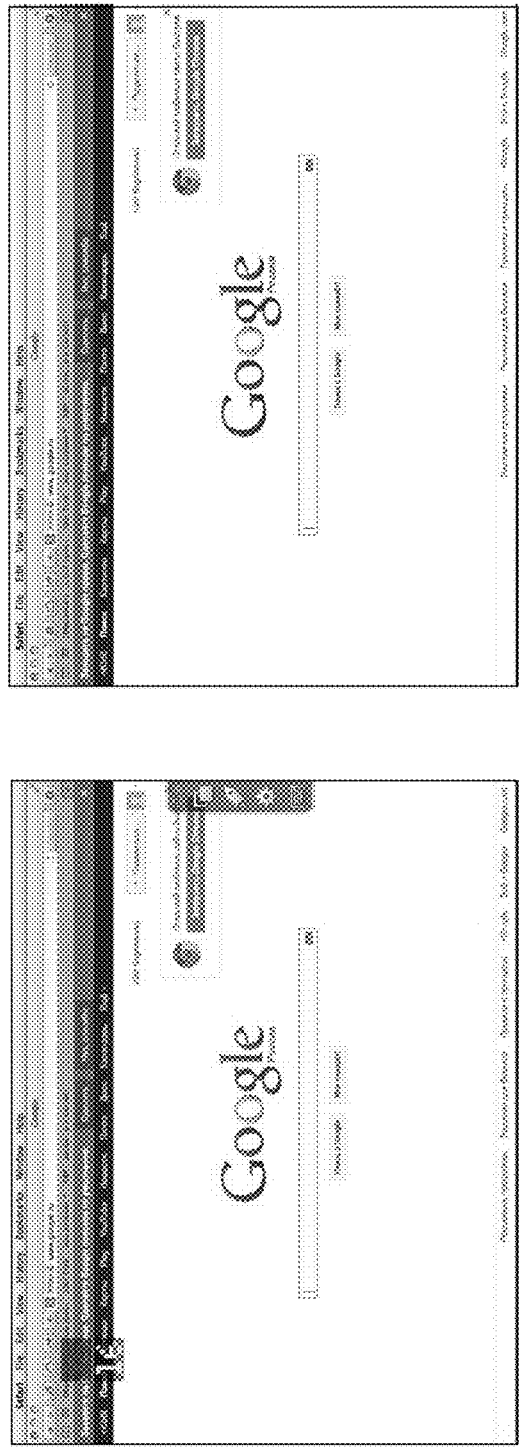
Figure 14:
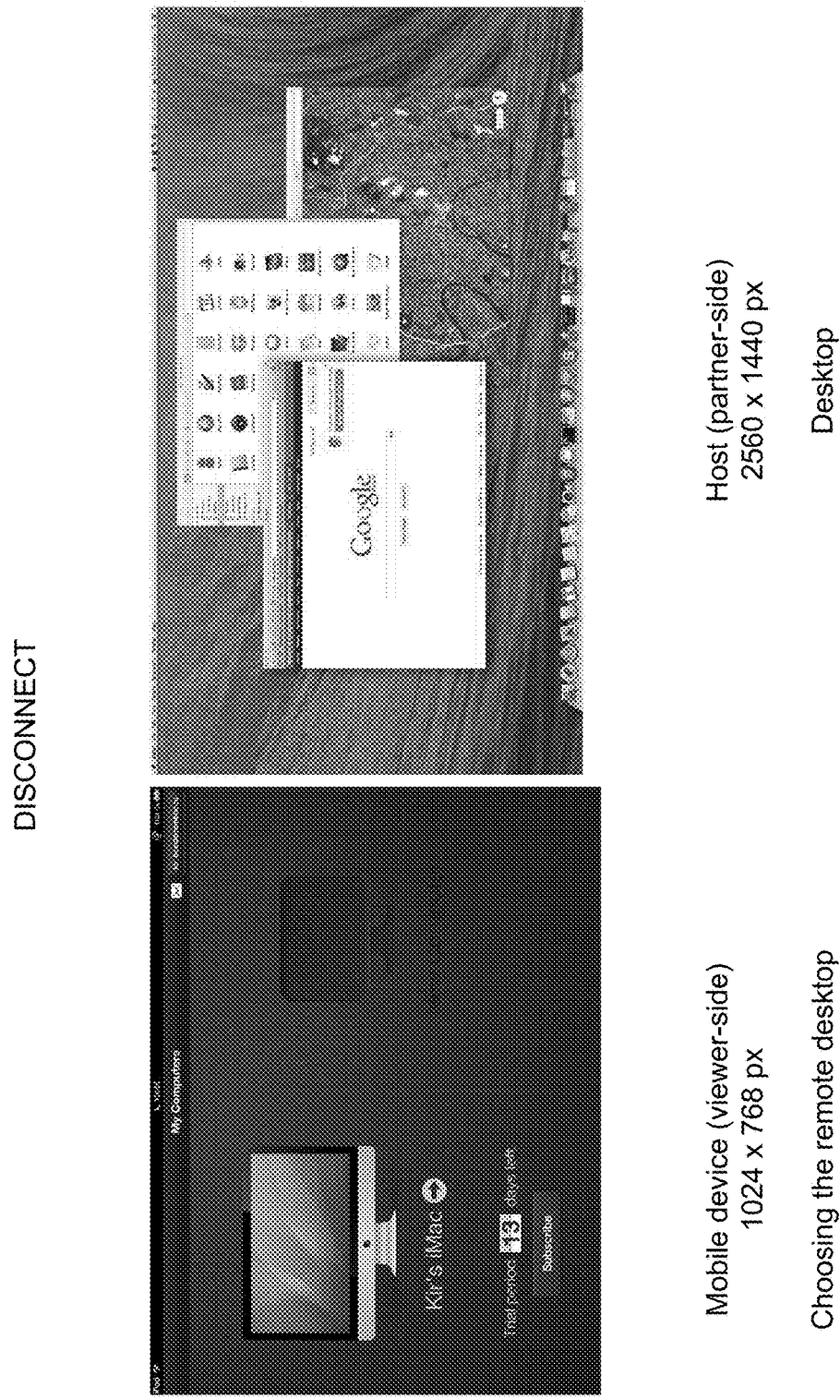

The screen of the mobile device has a small icon in the lower right corner. This icon allows for calling application windows of the active remote applications. The application windows are displayed on the mobile device screen in a small resolution. The remote applications' windows data is requested by the local-client from windows' name space and provided to the mobile device. FIG. 13 illustrates that the screens of the mobile device and the remote computer are the same and the mobile user works with the remote application(s). The application window could have been subjected to move or resize operations, but these operations are advantageously blocked. If the connection is dropped, the client interface displays a list of remote hosts and the remote host screen returns to its initial state (before the connection) as shown in FIG. 14.

As a further option, after a first user action, the remote application is verified in a database on the remote host, and any subsequent user actions are delayed until the verification is completed. Once the verification is completed, the user actions are filtered and blocked based on rules stored in the database.

The verification can be performed every time a remote application changes. As a further option, database descriptions for verified remote applications are cached locally for a limited period of time for further verification. When the remote application is running on the mobile device, all events generated by the mobile device are transmitted to the remote application without verification.

With reference to FIG. 6, an exemplary system for implementing the invention includes a general purpose computing device in the form of a personal computer (or a node) 102 or server or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer 102, such as during start-up, is stored in ROM 24. The personal computer/node 104 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 102.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The computer 104 includes a file system 36 associated with or included within the operating system 35, such as the WINDOWS NT™ File System (NTFS), one or more application programs 37, other program modules 38 and program data 39. A user may enter commands and information into the personal computer 104 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI and the like.

The computer 102 may operate in a networked environment using logical connections to one or more remote computers 49. The remote computer (or computers) 49 may be another personal computer, a server, a router, a network PC, a peer device or other common network node, and typically includes many or all of the elements described above relative to the computer 102.

The computer 102 may further include a memory storage device 50. The logical connections include a local area network (LAN) 51 and a wide area network (WAN) 52. Such networking environments are commonplace in offices, enterprise-wide computer networks, Intranets and the Internet. When used in a LAN networking environment, the personal computer 102 is connected to the local area network 51 through a network interface or adapter 53.

When used in a WAN networking environment, the personal computer 102 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 102, or portions thereof, may be stored in the remote memory storage device. It will be appreciated that the network connections shown are exemplary and other means of establishing a communications link between the computers may be used.

FIG. 7 is a block diagram of a mobile device 59 on which the invention can be implemented. The mobile device 59 can be, for example, a personal digital assistant, a cellular telephone, a network appliance, a camera, a smart phone, a tablet, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality.

For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, functionality of each corresponding device may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape.

In some implementations, the mobile device 59 may include circuitry and sensors for supporting a location determining capability, such as that provided by the global positioning system (GPS) or other positioning systems (e.g., systems using Wi-Fi access points, television commands, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video. The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

FIG. 8 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or command lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions. The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Having thus described the different embodiments of a system and method, it should be apparent to those skilled in the art that certain advantages of the described method and apparatus have been achieved. In particular, it should be appreciated by those skilled in the art that the proposed method provides for efficient use of remote applications on a mobile device by blocking mouse move and resize events.

It should also be appreciated that various modifications, adaptations, and alternative embodiments embodiments thereof may be made within the scope and spirit of the present invention. The invention is further defined by the following claims.

What is claimed is:

1. A system for intercepting events on a mobile device, the system comprising:
    a mobile device in communication with a remote host running a remote application;
    a Remote Access component for representing a remote application window on a mobile device screen;
    a control-agent on the remote host;
    a server connected between the mobile device and the remote host for selecting a proxy broker closest to the remote host for connecting the mobile device to the remote host,
    wherein:
        the Remote Access component provides coordinates of user touches on the mobile device screen to the control-agent; and
        the control-agent compares the user touches to a list of restricted elements for the remote application window, and blocks corresponding user actions if the user action matches an element from the list, and forwards the user actions otherwise.

2. The system of claim 1, wherein the mobile device and the remote host are connected through the proxy broker over a proxy broker connection.

3. The system of claim 1, wherein the control-agent determines areas of the remote application window that are restricted for move and resize by using a local database of applications when a host OS does not return the element identifier.

4. The system of claim 3, wherein the control-agent intercepts a first user action on the restricted area of the remote application window.

5. The system of claim 3, wherein the control-agent blocks all subsequent user actions, if a first user action occurs on the restricted area according to the local database.

6. The system of claim 3, wherein the control-agent transfers all subsequent user touch screen actions, if a first user action occurs on the non-restricted area according to the local database.

7. The system of claim 1, wherein the control-agent determines areas of the remote application window that are restricted for move and resize by using template coordinates of applications when a host OS does not return the element identifier and the local database does not contain the application.

8. The system of claim 7, wherein the control-agent blocks subsequent user touch screen actions after a first tap, if the first tap occurs on the restricted area, based on a comparison of coordinates of the first tap with the template coordinates.

9. The system of claim 7, wherein the control-agent transfers subsequent user actions after a first tap, if the first tap occurs on the non-restricted area based on a comparison of coordinates of the first tap with the template coordinates.

10. The system of claim 1, wherein the remote host has a plurality of the control-agents corresponding to multiple connections between the remote host and the mobile device.

11. The system of claim 1, wherein the control-agent receives coordinates of a point where a mobile device user touches the mobile device screen and uses the coordinates to determine if the move and resize events need to be blocked.

12. The system of claim 1, further comprising a service daemon running on the remote host and connected to the server for listening for commands from the Remote Access component.

13. The system of claim 12, wherein the service daemon provides the commands to the control-agent.

14. The system of claim 1, wherein, after a first user action, the remote application is verified in a database on the remote host, and any subsequent user actions are delayed until the verification is completed, and, once the verification is completed, the user actions are filtered and blocked based on rules stored in the database.

15. The system of claim 14, wherein the verification is performed every time a remote application changes.

16. The system of claim 14, wherein database descriptions for verified remote applications are cached locally for further verification.

17. The system of claim 14, wherein the remote application is running on the mobile device, all events generated by the mobile device are transmitted to the remote application without verification.

18. The system of claim 1, wherein the control-agent obtains element identifiers and application identifiers of the user touches from a host OS of the remote host.

19. A computer-implemented method for intercepting events on a mobile device, the method comprising:
    (a) connecting the mobile device to a remote host running a remote application through a proxy broker closest to the remote host;
    (b) capturing a window of the remote application on the remote host;
    (c) launching a control-agent on the remote host for intercepting and blocking events on the window generated on the mobile device;
    (d) providing coordinates of user touches to the control-agent; and (e) blocking user actions, if the coordinates indicate a restricted element of the window, and executing the user actions in the remote application otherwise, wherein the control-agent determines if the element is restricted by checking a restricted elements database for step (e).

20. A system for intercepting events on an application window generated on a mobile device, the system comprising:

a processor;

a memory coupled to the processor;

a computer program logic stored in the memory and executed on the processor, the computer program logic for executing the steps of:

(a) connecting the mobile device to a remote host running a remote application through a proxy broker closest to the remote host;

(b) capturing a remote application window on the remote host;

(c) launching a control-agent on the remote host for blocking events on the remote application window generated on the mobile device;

(d) providing coordinates of user touches to the control-agent; and (e) blocking user actions, if the coordinates indicate a restricted element of the remote application window, and executing the user actions in the remote application otherwise, wherein the control-agent determines if the element is restricted by checking a restricted elements database.

* * * * *